3,449,418
ETHERIFIED BISARYL COMPOUNDS
Lincoln Harvey Werner, Summit, N.J., assignor to Ciba Corporation, New York, N.Y., a corporation of Delaware
No Drawing. Continuation-in-part of application Ser. No. 448,265, Apr. 15, 1965. This application Dec. 22, 1965, Ser. No. 515,752
Int. Cl. C07c *103/28, 93/00*
U.S. Cl. 260—559    14 Claims

ABSTRACT OF THE DISCLOSURE

Etherified bisaryl compounds of the formula

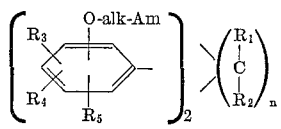

wherein:
$n = 0$ or 1
$R_1 =$ H, OH or alkyl
$R_2 =$ H, alkyl, carboxyalkyl, cycloalk(en)yl, cycloalk(en)ylalkyl, aralkyl or aryl
$R_3 =$ alkyl, halogen or nitro
$R_4$, $R_5 =$ H, alkyl or halogen and salts thereof exhibit predominantly antiparasitic (taeniacidal) effects.

CROSS-REFERENCES TO RELATED APPLICATIONS

This is a continuation-in-part of application Ser. No. 448,265, filed Apr. 15, 1965.

The present invention concerns and has for its object the provision of etherified bisaryl compounds and methods for their preparation.

More particularly, it relates to compounds having the general Formula I

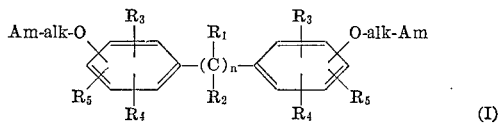

in which Am stands for an amino group, alk for lower alkylene with at least 3 carbon atoms and separating the amino group from the oxygen atom by at least 2 carbon atoms, $R_1$ for hydrogen, hydroxy or lower alkyl, $R_2$ for hydrogen, lower alkyl, free esterified or amidated carboxy-lower alkyl, cycloalkyl or -alkenyl, cycloalkyl- or -alkenyl-lower alkyl, monocyclic carbocyclic aryl or aryl-lower alkyl, $R_3$ for lower alkyl, halogen or nitro, each of $R_4$ and $R_5$ for hydrogen, lower alkyl or halogen, $n$ for the integer 0 or 1, and salts thereof.

The amino groups Am stand particularly for secondary or, advantageously, tertiary amino groups. Substituents in such amino groups are, for example, aliphatic radicals, especially lower alkyl, e.g. methyl, ethyl, propyl, isopropyl, butyl, isobutyl, secondary butyl, tertiary butyl, pentyl, neopentyl, hexyl or heptyl, lower alkenyl, e.g. allyl or methallyl, lower alkylene e.g. 1,2-ethylene, 1,3-propylene, 1,4-butylene, 1,4- or 1,5-pentylene, 3-methyl-1,5-pentylene, 1,4-, 1,5-, 2,5- or 1,6-hexylene, 1,4-, 1,5-, 1,6-, 1,7-, 2,5- or 2,6-heptylene or 4-methyl-2,6-heptylene, lower alkenylene, e.g. 1,4-but-2-enylene or 2,5-hex-3-enylene, mono-aza-, -oxa- or -thia-lower alkylene, e.g. 3-aza-1,5-pentylene, 3-lower alkyl-3-aza-1,5-pentylene, such as 3-methyl- or 3-ethyl-3-aza-1,5-pentylene, 3-aza-1,6-hexylene, 3-lower alkyl-3-aza-1,6-hexylene, 3-oxa- or 3-thia-1,5-pentylene or -1,5-hexylene, cycloalkyl or cycloalkyl-lower alkyl having preferably five or six ring-carbon atoms, e.g. cyclopentyl or cyclohexyl, cyclopentylmethyl or 2-cyclohexylethyl, monocyclic carbocylic aryl or monocyclic carbocyclic aryl-lower alkyl, e.g. phenyl, benzyl, 1-phenylethyl or 2-phenylethyl. These amino radicals may be unsubstituted or substituted, the aliphatic radicals especially by free, esterified or etherified hydroxy groups, such as lower alkanoyloxy, e.g. acetoxy, propionyloxy, butyryloxy or pivalyloxy, or lower alkoxy, e.g. methoxy, ethoxy, n-propoxy, isopropoxy or n-butoxy and the remaining radicals, especially in the aromatic portion, additionally by lower alkyl, e.g. that mentioned above, halogen, e.g. fluoro, chloro or bromo, or trifluoromethyl.

Accordingly, secondary amino groups are, for example, lower alkylamino, e.g. methylamino, ethylamino or n-propylamino, cycloalkylamino, e.g. cyclopentylamino or cyclohexylamino, cycloalkyl-lower alkylamino, e.g. cyclopentylmethylamino or 2-cyclohexylethylamino, monocyclic carbocyclic arylamino, e.g. phenylamino or p-tolylamino or monocyclic carbocyclic aryl-lower alkylamino, e.g. benzylamino, 1- or 2-phenylethylamino.

Examples for tertiary amino groups are the following: primarily di-lower alkylamino, e.g. dimethylamino, N-methyl-N-ethylamino, diethylamino, di-n-propylamino, di-isopropylamino or di-n-butylamino, N-cycloalkyl-N-lower alkylamino; e.g. N-cyclopentyl-N-methylamino, N-cyclohexyl - N - methylamino or N-cyclohexyl-N-ethylamino; N-lower alkyl-N-phenyl-lower alkylamino, e.g. N-methyl-N-benzyl-amino, N-ethyl-N-benzyl-amino, N-ethyl-N-(1-phenylethyl)-amino or N-methyl-N-(2-phenylethyl)-amino; N-hydroxy-lower alkyl-N-lower alkylamino or N,N-di-(hydroxy-lower alkyl)-amino in which hydroxyl is separated from the amino-nitrogen by at least two carbon atoms, e.g. N-(2-hydroxyethyl)-N-methylamino or N,N-di-(2-hydroxyethyl)-amino; or alkyleneimino with four to eight ring-carbon atoms, such as pyrrolidino, 2-methyl-pyrrolidino, piperidino, 2-methyl-piperidino, 4-methyl-piperidino, 1,6-hexyleneimino or 1,7-heptyleneimino; azaalkyleneimino with four to six ring carbon atoms separating the two nitrogen atoms by at least two carbon atoms, particularly N-lower alkyl-aza-alkyleneimino, such as piperazino, 4-lower alkyl-piperazino, e.g. 4-methyl-piperazino, 4-ethyl-piperazino, as well as 4-hydroxyethyl-piperazino, 4-acetoxyethyl-piperazino, 4-morpholino, 3-methyl-4-morpholino or 4-thiamorpholino.

The lower alkylene groups -alk- represent preferably 1,3-propylene, but also 2-methyl-1,3-propylene, 1,3-, 2,4- or 1,4-butylene, 2-methyl - 2,4 - butylene, 3-methyl-1,4-butylene, 1,3-, 1,4-, 1,5-, 2,4-, 2,5- or 3,5-pentylene, 2,5- or 1,6-hexylene or 3,5-heptylene.

Lower alkyl, which may represent $R_1$, $R_2$, $R_3$ $R_4$ and/or $R_5$, has been exemplified above. The radical $R_2$ preferably stands for lower alkyl, cycloalkyl or cycloalkyl-lower alkyl with five or six ring-carbon atoms, monocyclic carboxylic aryl or aryl-lower alkyl, or the corresponding substituted radicals, examples of which have been given above. $R_2$ may also represent cycloalkenyl or cycloalkenyl-lower alkyl having preferably five or six ring-carbon atoms, e.g. 2- or 3-cyclopentenyl, 1- or 3-cyclohexenyl, 3-cyclopentenyl-methyl, or 3-cyclohexenyl-methyl or free, esterified or amidated carboxy-lower alkyl, e.g. carboxy-methyl, 1- or 2-carboxy-ethyl, 1-, 2- or 3-carboxy-propyl, 2-carboxy-isopropyl, 1-, 2-, 3- or 4-carboxy-butyl or the corresponding groups esterified with a lower alkanol, e.g. methanol, ethanol, propanol, sec. propanol or a butanol or amidated with ammonia or a di-lower alkylamine, e.g. dimethylamine or diethylamine.

A halogen atom $R_3$, $R_4$ and/or $R_5$ preferably stands for chloro, but also for fluoro or bromo.

The compounds of the invention exhibit valuable pharmacological properties. Apart from anti-inflammatory and trypanocidal activity they show primarily antibacterial, antifungal and predominantly antiparasitic, particularly taeniacidal, effects as can be demonstrated in in vitro and animal tests, using for the latter, for example, mice and sheep as test objects. They are, therefore, useful as anti-inflammatory, antiprotozoal, antibacterial, antifungal and particularly antiparasitic agents, especially as taeniacides, in the treatment of tapeworm infestations, caused for example, by *Hymenolepis nana, Dypilidium canium, Taena pisiformis* or *Moniezia expansa*. They are also useful as intermediates in the preparation of other valuabe products, preferably or pharmacologically active compounds.

Particularly useful are compounds of the Formula II

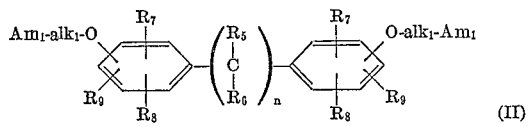

in which $Am_1$ stands for di-lower alkylamino, $alk_1$ for alkylene with 3 to 5 carbon atoms separating $Am_1$ from the oxygen atom by at least 2 carbon atoms, $R_5$ for hydrogen or lower alkyl, $R_6$ for hydrogen, lower alkyl, carboxy-lower alkyl, lower alkoxycarbonyl-lower alkyl, carbamyl-lower alkyl, N,N-di-lower alkylcarbamyl-lower alkyl, cycloalkyl or cycloalkenyl having five or six ring-carbon atoms, phenyl, lower alkylphenyl, lower alkoxyphenyl, halophenyl or lower alkyl- halophenyl, $R_7$ for lower alkyl, chloro or nitro, each of $R_8$ and $R_9$ for hydrogen, lower alkyl or chloro and $n$ for the integer 0 to 1, and the acid addition salts thereof.

Compounds that are especially valuable are those of the Formula III

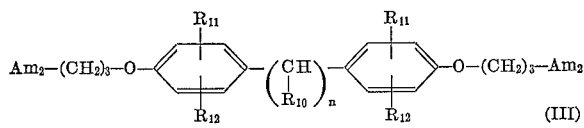

in which $Am_2$ stands for dimethylamino or diethylamino, $R_{10}$ for hydrogen, lower alkyl, cycloalkyl or cycloalkenyl having five or six ring-carbon atoms, phenyl, lower alkylphenyl or halophenyl, $R_{11}$ for lower alkyl, $R_{12}$ for tertiary lower alkyl, and $n$ for the integer 0 or 1, and their therapeutically acceptable acid addition salts.

The compounds of this invention are prepared according to methods in themselves known. For example, the process for their preparation consists in:

(a) Converting in a compound of the Formula IV

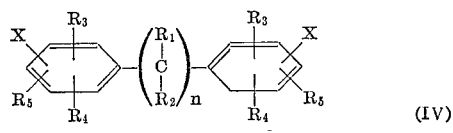

in which X stands for a group capable of being converted into the group Am-alk-O-, X into said group, or (b) Converting in a compound of the Formula V

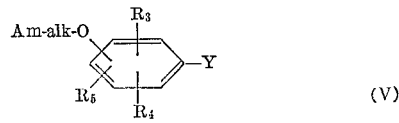

in which Y stands for a group capable of being converted into the radical

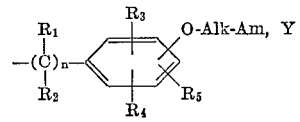

into said radical or (c) Replacing in a compound of the Formula VI

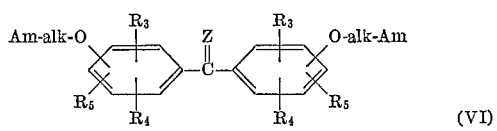

in which Z stands for a group capable of being converted into both of $R_1$ and $R_2$, Z by $R_1$ and $R_2$ and, if desired, converting a resulting base into a salt thereof or, converting a resulting salt into the free base or into another salt.

A particularly suitable group representing X is hydroxyl. Usually, the corresponding starting material, or preferably a salt thereof, is reacted with a reactive ester of the amino-lower alkanol Am-alk-OH, above all that with a strong mineral acid, such as a hydrohalic acid, e.g. hydrochloric or hydrobromic acid. It may also be esterified with a strong organic sulfonic acid, such as a lower alkane sulfonic acid, e.g. methane or ethane sulfonic acid, or a monocyclic carboxylic aryl-sulfonic acid, e.g. p-toluene sulfonic acid.

As noted above, the starting material is preferably used in the form of a salt thereof. Such salt, for example, a metal salt, particularly an alkali metal salt, e.g. lithium, sodium or potassium salt, as well as an alkaline earth metal salt or any other suitable salt, is formed, for example, by treatment of the starting material with a metal salt-forming reagent, such as an alkali metal hydride or amide, e.g. lithium hydride, sodium hydride, sodium amide or potassium amide, an alkali metal or alkaline earth metal lower alkoxide, e.g. lithium, sodium, potassium or calcium methoxide, ethoxide, or tertiary butoxide, or an alkali metal compound of a hydrocarbon, e.g. butyl lithium, phenyl lithium or phenyl sodium. Formation of the metal compound of the starting material may also be achieved in situ; for example, the free starting material and the reactive ester of the amino-lower alkanol may be reacted in the presence of a salt-forming reagent, for example, an alkali metal carbonate.

The conversion of hydroxyl representing X into amino-lower alkoxy may also be achieved by treating the corresponding starting material with an amino-lower alkanol in the presence of a condensing agent, such as a di-substituted carbonate, for example, a diaryl carbonate, e.g. diphenyl carbonate, or more particularly, a di-lower alkyl carbonate, e.g. dimethyl carbonate, ethyl methyl carbonate, diethyl carbonate or dibutyl carbonate, or a carbodiimide, e.g. dicyclohexyl-carbodiimide.

Another group X capable of being converted into amino-lower alkoxy is a halogeno-, lower alkoxy- or phenoxycarbonyloxy group. Upon reacting a corresponding starting material with an amino-lower alkanol, the compounds of the invention are formed.

A further group X capable of being converted into amino-lower alkoxy is a reactive esterified hydroxy-lower alkoxy group derived from the previously mentioned acids. X stands primarily for halogeno-, particularly chloro-lower alkoxy. A corresponding starting material is reacted with the amine H-Am to yield the desired compounds.

In the starting material used in reaction (b) Y represents, for example, a hydrogen atom, which can be replaced by reaction with a compound having the Formula VII

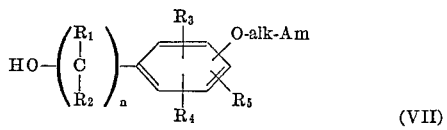
(VII)

or a reactive ester thereof, particularly the corresponding halide, e.g. chloride or bromide, in the presence of a Lewis acid, particularly a Friedel-Crafts catalyst, e.g. aluminum or ferric chloride or p-toluene sulfonic acid.

The group Y may also be a halogen atom, e.g. chloro, bromo or iodo, or a corresponding group after Grignardation. Such starting materials are reacted with a reactive ester of compounds having the Formula VII, if necessary in the presence of a reactive metal or organic metal compound, such as an alkali metal, e.g. lithium sodium or potassium, or a zinc di-lower alkyl, e.g. zinc dimethyl.

In the starting material used in reaction (c), Z represents, for example, an oxo group. It can be replaced by two hydrogen atoms, if the corresponding ketone is reduced, for example, according to catalytic hydrogenation, e.g. with the use of copper-alumina or copper-chromium catalysts under high pressure conditions, or according to the Clemmensen or Wolff-Kishner method. Z, representing oxo, may also be replaced by hydroxy and $R_2$ according to the Grignard method or by reduction with a complex light metal hydride, such as lithium aluminum hydride or sodium borohydride.

Z may also stand for hydrogen or lower alkyl and a reactively esterified hydroxy group, especially a halogen atom, and the latter can be replaced by hydrogen according to reductive elimination reactions, e.g. with the use of a metal, such as zinc, magnesium or nickel-aluminum alloy in an acidic or alkaline medium respectively, of a complex light metal hydride, e.g. lithium aluminum hydride or an organometallic compound, e.g. a Grignard compound and hydrolysis of the metallic intermediate. It can also be replaced by the radical $R_2$ according to the Wurtz-Fittig method already described under reaction (b).

The above-mentioned reactions are carried out according to standard methods, in the presence or absence of a diluent, preferably such as is inert to the reagents and is a solvent thereof, of a catalyst, condensing agent and/or an inert atmosphere, at low temperatures, room temperature or preferably elevated temperatures, at atmospheric or superatmospheric pressure.

Depending on the reaction conditions used, the compounds of the invention are obtained in the form of the free bases or of their salts. Salts that are obtained can be converted into the free bases in known manner for example, with alkalies, e.g. alkali metal hydroxides or carbonates, or with ion exchangers. A resulting salt may also be converte dinto another salt according to known methods, for example, by treatment with an anion exchanger or with the salt of an acid whose cation forms with the anion of the salt of this invention a precipitate, e.g. reacting a hydrochloride or sulfate of this invention with a silver or barium salt respectively.

Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic, or heterocyclic carboxylic or sulfonic acids, for example, formic, acetic, propionic, succinic, glycollic, lactic, malic, tartaric, citric, ascorbic, maleic, hydroxymaleic pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzene-sulfonic, toluenesulfonic, naphthalene-sulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

Mainly, those starting materials should be used in the reactions of the invention that lead to the formation of those compounds indicated above as being specially valuable.

The starting materials are known or, if new, can be prepared in a manner known per se.

The compounds of this invention are useful in the form of pharmaceutical compositions suitable for enteral, e.g. oral, parenteral or topical use. Essentially, they comprise a pharmacologically effective amount of one of the compounds of this invention in admixture with a pharmaceutically acceptable, organic or inorganic, solid or liquid carrier, which usually represents the major portion by weight of such composition. These preparations are in solid form, for example, as capsules, tablets or dragees, in liquid form, for example, as solutions or suspensions, or in the form of emulsions, e.g. salves or creams. Suitable carrier materials, are, for example, starches, e.g. corn starch, wheat starch or rice starch, sugars, e.g. lactose, glucose or sucrose, stearic acid or salts thereof, e.g. magnesium stearate or calcium stearate, benzyl alcohol, stearyl alcohol, cetyl alcohol, petrolatum, talc, gums, acacia, tragacanth, sodium lauryl sulfate, propylene glycol or polyalkylene glycols. The quantity and the nature of the carrier ingredients can vary widely and depend, inter alia, upon the desired physical appearance or size of the composition or method or manufacture. Encapsulation may be effected by using, if desired, the same excipients as those for tablets. If necessary, the compositions may contain other auxiliary substances, such as preserving, stabilizing, wetting or emulsifying agents, salts for varying the osmotic pressure or buffers. They may also contain, in combination, other pharmacologically useful substances. The compounding of the formulations is generally carried out in the manner normally employed in the art, i.e. by manufacturing a mixture or a granulate. Any compatible color, approved and certified under the provisions of the Federal Food, Drug and Cosmetic Law may be used for aesthetic purposes or as a means of identification.

The following examples are intended to illustrate the invention and are not to be construed as being limitations thereon. Temperatures are given in degrees centigrade.

Example 1

To a solution of 9.6 g. 1,1-di(4-hydroxy-2-methyl-5-tert. butyl-phenyl)-n-butane in 25 ml. dimethyl formamide and 45 ml. toluene, 2.25 g. of a 53% suspension of sodium hydride in mineral oil are added gradually with stirring in an atmosphere of nitrogen. After stirring for one hour at room temperature a solution of 6.7 g. 3-dimethyl-amino-propyl chloride in 55 ml. toluene is added and the reaction mixture is kept at 70–80° for 8 hours. After cooling, it is filtered and concentrated in vacuo. The residue is dissolved in diethyl ether, the solution washed with water, dried and concentrated. The concentrate is dissolved in ethyl acetate and a solution of hydrogen chloride in ethyl acetate is added. The precipitate formed is filtered off and recrystallized from isopropanol-ethyl-acetate. There is obtained the 1,1-di-[4-(3-dimethylamino-propoxy)-2-methyl-5-tert. butylphenyl]-n-butane dihydrochloride of the formula

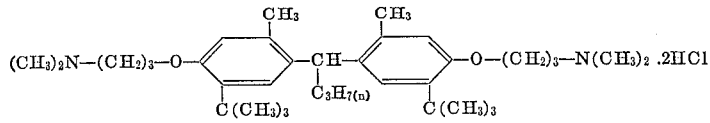

melting at 249–251°.

Example 2

To the solution of 8.2 g. 4,4′-dihydroxy-3,3′-dimethyl-5,5′-di-tert. butyl-[1,1′-biphenyl] in 25 ml. dimethyl formamide and 45 ml. toluene, kept under nitrogen, 2.25 g. of a 53% suspension of sodium hydride in mineral oil are added gradually with stirring and stirring is continued for one hour at room temperature. Thereupon a solution of 6.7 g. 3-dimethylamino-propyl chloride in 55 ml. toluene is added and the reaction mixture is stirred at 70–80° for 8 hours. After cooling it is worked up as described in Example 1 to yield the 4,4′-(3-dimethylamino-propoxy)-3,3′-dimethyl-5,5′-di-tert. butyl-[1,1′-biphenyl] dihydrochloride of the formula

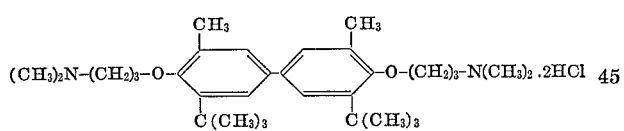

melting at 258–260° after recrystallization from isopropanol-ethyl acetate.

Example 3

Substituting in Example 2 the p,p′-biphenol by 10.3 g. of 4,4′-dihydroxy-3,3′,5,5′-tetra-tert. butyl-[1,1′-biphenyl] and performing the procedure as described therein, there is obtained the 4,4′-(3-dimethylamino-propoxy)-3,3′,5,5′-tetra-tert. butyl-[1,1′-biphenyl] dihydrochloride of the formula

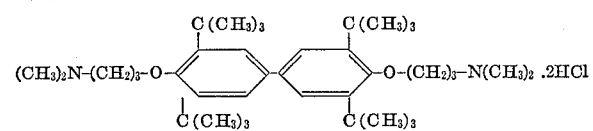

melting at 302° (dec.), after recrystallization from isopropanol.

Example 4

To the solution of 8.5 g. di(4-hydroxy-3-methyl-5-tert. butyl-phenyl)-methane in 25 ml. dimethyl formamide and 45 ml. toluene, kept under nitrogen, 2.25 g. of a 53% suspension of sodium hydride in mineral oil are added gradually with stirring. After stirring for one hour at room temperature the solution of 6.7 g. 3-dimethyl-amino-propyl chloride in 55 ml. toluene is added and the reaction mixture is stirred at 70–80° for 8 hours. After cooling it is worked up as described in Example 1 and there is obtained the di-[4-(3-dimethylamino-propoxy)-3-methyl-5-tert. butyl-phenyl]-methane dihydrochloride of the formula

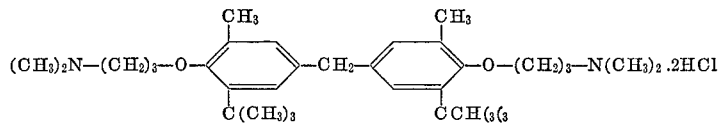

melting at 212–214° after recrystallization from isopropanolethyl acetate.

Example 5

Substituting in Example 4 the diphenylmethane by 10.6 g. of di-(4-hydroxy-3,5-di-tert. butyl-phenyl)-methane and following the procedure described therein, there is obtained the di-[4-(3-dimethylamino-propoxy)-3,5-di-tert. butyl-phenyl]methane dihydrochloride of the formula

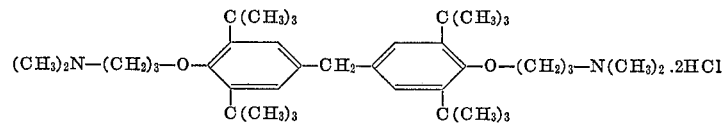

melting at 305° (dec.) after recrystallization from ethanolethyl acetate.

Example 6

By reacting 5.5 g. of di-(4-hydroxy-2-methyl-5-tert. butyl-phenyl)-(3-cyclohexenyl)-methane in 15 ml. dimethylformamide and 30 ml. toluene, with 1.18 g. of a 53% suspension of sodium hydride in mineral oil and then with 3.5 g. 3-dimethylamino-propyl chloride in 28 ml. toluene, according to the procedure shown in Example 1, but heating the reaction mixture only to 65–75° for 18 hours, there is obtained the di-[4-(3-dimethylamino-propoxy)-2-methyl-5-tert. butyl-phenyl]-(3-cyclohexenyl)-methane dihydrochloride of the formula

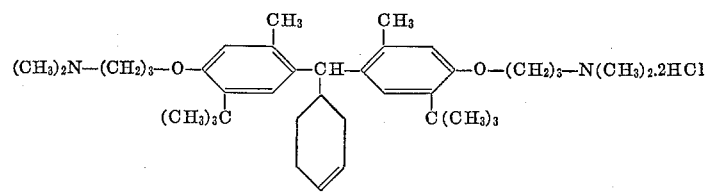

melting at 173–175° after recrystallization from isopropanolethyl acetate.

Example 7

Following the procedure shown in Example 1 but using 8.2 g. di-(4-hydroxy-2-methyl-5-tert. butyl-phenyl)-phenyl-methane in 25 ml. dimethyl formamide and 45 ml. toluene, 1.8 g. of a 53% suspension of sodium hydride in mineral oil and 5.4 g. 3-dimethylamino-propyl chloride in 46 ml. toluene, there is obtained the di-[4-(3-dimethylamino-propoxy)-2-methyl - 5 - tert. butyl-phenyl]-phenyl-methane dihydrochloride of the formula

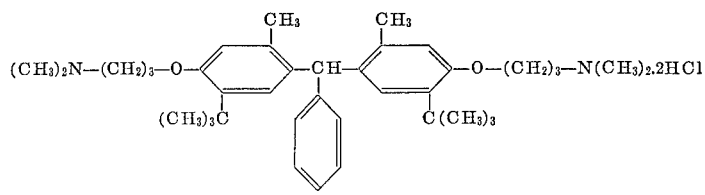

melting at 234–238° after recrystallization from isopropanolethyl acetate.

Example 8

In the manner described in the previous examples, the following compounds can be prepared by using equivalent amounts of the corresponding starting materials:

2,2-di-[4-(3-dimethylamino-propoxy)-2-methyl-5-tert. butyl-phenyl]-propane,

γ-di-[4-(3-dimethylamino-propoxy)-2-methyl-5-tert. butyl-phenyl]-valeric acid ethyl ester, γ-di-[4-(3-dimethylamino-propoxy)-2-methyl-5-tert. butyl-phenyl]-valeric acid amide, di-[4-(3-dimethylamino-propoxy)-2-methyl-5-tert. butyl-phenyl]-cyclopentyl-methane, 2-methyl-1,1-di-[4-(3-dimethylamino-propoxy)-2-methyl-5-tert. butyl-phenyl]-propane, 1-phenyl-1,1-di-[4-(3-dimethylamino-propoxy)-2-methyl-5-tert. butyl-phenyl]-ethane, 1-(3-chloro-phenyl)-1,1-di-[4-(3-diethylamino-propoxy)-2-ethyl-5-tert. butyl-phenyl]-n-propane, 1-(4-methyl-phenyl)-1,1-di-[4-(3-diethylamino-propoxy)-3-tert. butyl-phenyl]-n-hexane, 3,3-di-[4-(3-dimethylamino-propoxy)-2-methyl-5-tert. butyl-phenyl]-n-pentane, 4,4'-di-(2,2-dimethyl-3-dimethylamino-propoxy)-2,2'-di-sec. propyl-[1,1'-biphenyl], 4,4'-di-(4-diethylamino-butoxy),3,3',5,5'-tetra-sec. propyl-[1,1'-biphenyl], 3,3'-di-(3-dimethylamino-propoxy)-5,5'-di-tert. butyl-[1,1'-biphenyl], di-[3-(3-dimethylamino-propoxy)-5-tert. butyl-phenyl]-(4-tert. butyl-phenyl)-methane, 1,1-di-[4-(3-diethylamino-propoxy)-2-methyl-5-tert. pentyl-phenyl]-(3-chloro-5-methyl-phenyl)-methane and their dihydrochloride, sulfate, maleate and tartrate.

Example 9

To a solution of 32.6 g. 4,4'-dihydroxy-3,3'-dimethyl-5,5'-di-tert. butyl-[1,1'-biphenyl] in 100 ml. dimethyl formamide and 180 ml. toluene, 9.0 g. of a 53% suspension of sodium hydride in mineral oil are added gradually with stirring under nitrogen. After stirring for one hour at room temperature, a solution of 26.7 g. 2-dimethylamino-n-propyl chloride in 19 ml. toluene are added slowly and the reaction mixture is kept at about 80° for eight hours. After cooling it is filtered, evaporated in vacuo and the residue dissolved in diethyl ether. The solution is washed with water, dried and acidified with a solution of hydrogen chloride in ethyl acetate. The crystals formed are collected and recrystallized two times from isopropanol-ethyl acetate (1:1) to yield the 4,4'-(2-dimethylamino-n-propoxy)-3,3'-dimethyl-5,5'-di-tert. butyl-[1,1'-biphenyl] dihydro-chloride of the formula

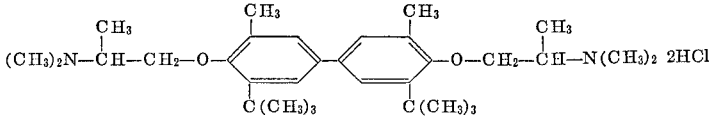

melting at 263–264°.

Example 10

To the solution of 9.0 g. 4,4'-dihydroxy-2,2',6,6'-tetra-methyl-[1,1-biphenyl] in 38 ml. dimethyl formamide and 33 ml. toluene, 3.4 g. of a 53% suspension of sodium hydride in mineral oil are added at room temperature while stirring under nitrogen. After the hydrogen evolution has ceased a solution of 10.3 g. 3-dimethylamino-propyl chloride in 65 ml. toluene are added slowly whereupon the reaction mixture is kept at 70–80° for 21 hours. The reaction mixture is worked up as shown in Example 9 and the hydrochloride obtained triturated with hot ethanol, to yield the 4,4'-(3-dimethylamino-propoxy) - 3,3',5,5' - tetramethyl-[1,1'-biphenyl]dihydro-chloride of the formula

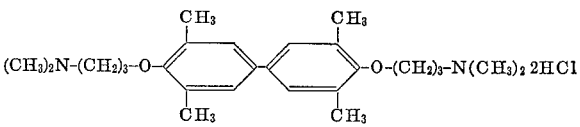

melting at 288° (dec.).

Example 11

To the solution of 10.3 g. γ-di-(4-hydroxy-3-nitro-phenyl)-valeric acid N,N-dimethylamide in 25 ml. dimethyl formamide and 45 ml. toluene, 2.5 g. of a 53% sodium hydride suspension in mineral oil are added while stirring. After termination of the hydrogen evolution 45 ml. of a toluene solution containing 1 g. 3-dimethylamino-propyl chloride in 6.5 ml. are added and the mixture is kept overnight at 75°. The solution is decanted off the reddish salts and evaporated in vacuo. The residue is dissolved in ethyl acetate to yield solution A. To the reddish salts water and ethyl acetate are added, the organic layer separated, dried and combined with solution A. It is dried, filtered, the filtrate acidified with a solution of hydrochloric acid in ethyl acetate and the precipitate formed separated and dissolved in water. The aqueous solution is extracted with ethyl acetate, made basic with 2 N sodium hydroxide and again extracted with ethyl acetate. The latter extract is evaporated, the residue dissolved in 100 ml. ethyl acetate and the solution again acidified with hydrogen chloride in ethyl acetate. The precipitate formed is filtered off, washed with ethyl acetate and anhydrous diethyl ether and dried to yield the γ-di-[4-(3 - dimethylamino - propoxy)-3-nitro-phenyl]-valeric acid N,N-dimethylamide dihydrochloride of the formula

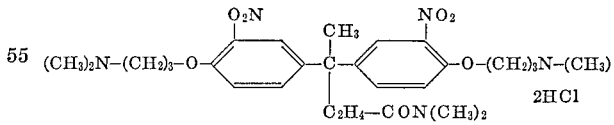

melting at about 95°.

Example 12

To the solution of 11.3 g. γ-di-(4-hydroxy-3,5-dichloro-phenyl)-valeric acid N,N-dimethylamide in 25 ml. dimethyl formamide and 45 ml. toluene, 2.25 g. of a 53% sodium hydride suspension in mineral oil are added while stirring under nitrogen. After 45 minutes 6.7 g. 3-dimethylamino-propyl chloride in 45 ml. toluene are added and the mixture is kept at 75° for 20 hours. It is filtered, the residue washed with toluene and the filtrate evaporated in vacuo. The residue is dissolved in ethyl acetate, the solution washed with water, dried and filtered. The filtrate is strongly acidified with a saturated solution of hydrogen chloride in ethyl acetate whereby an oil separates. It is dissolved in water and the solution extracted with ethyl acetate. The aqueous layer is made basic and extracted with ethyl acetate. The latter is dried, evaporated and to the residue diethyl ether is added, which is also stripped off. The residue is dissolved in ethyl acetate, the solution acidified with hydrogen chloride in ethyl acetate, the solid formed filtered off, washed with ethyl acetate and diethyl ether and dried in a vacuum desiccator to yield the γ-di-[4-(3-dimethylamino-propoxy)-3,5-dichloro-phenyl]-valeric acid N,N-dimethylamide of the formula

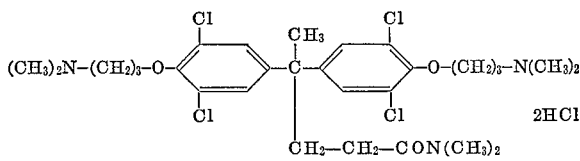

melting at 110–115°.

Example 13

In the manner described in the previous examples 10.1 g. di-(2-hydroxy-3,5,6-trichloro - phenyl) - methane in 25 ml. dimethyl formamide and 45 ml. toluene are reacted with 2.25 g. of the 53% sodium hydride suspension and then with 6.7 g. 3-dimethylamino-propyl chloride in 57 ml. toluene to yield the di-[2-(3 - dimethylamino-propoxy)-3,5,6-trichloro-phenyl] - methane dihydrochloride of the formula

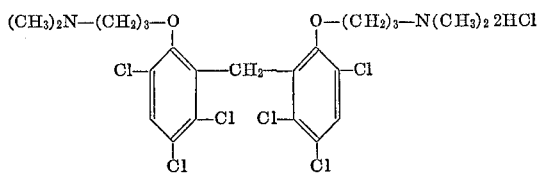

which is purified as follows: The oily hydrochloride is triturated several times with ethyl acetate and the solution discarded. Finally the hydrochloride is dissolved in water, the solution made basic with 2 N sodium hydroxide and extracted with ethyl acetate. The extract is dried, filtered and evaporated. The residue is triturated several times with hot hexane, the hexane decanted off and evaporated in vacuo. The residue is dissolved in ethyl acetate, the solution acidified with hydrogen chloride in ethyl acetate and the precipitate formed filtered off. The so-obtained pure compound melts at 140°.

Example 14

Preparation of 500 capsules each containing 0.50 g. of the active ingridient.

Ingredients and procedure:                                         G.
    4,4' - (3 - dimethylamino - propoxy) - 3,3'-
      dimethyl - 5,5' - di - tert. butyl - [1,1'-
      biphenyl] dihydrochloride _____ 250.00
    Lactose _____  65.00
    Magnesium stearate _____  10.00

The ingredients are blended in a suitable mixer, sieved through a No. 40 screen again mixed. Portions weighing 0.65 g. each of the resulting mixture are filled into No. 0 capsules.

What is claimed is:
1. A compound having the formula

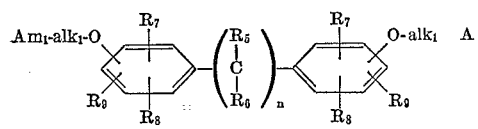

in which $Am_1$ stands for di-lower alkylamino, $alk_1$ for alkylene with three to five carbon atoms separating $Am_1$ from the oxygen atom by at least two carbon atoms, $R_5$ for a member selected from the group consisting of hydrogen and lower alkyl, $R_6$ for a member selected from the group consisting of hydrogen, carboxy-lower alkyl, carbamyl-lower alkyl, N,N-di-lower alkylcarbamyl-lower alkyl, cycloalkyl and cycloalkenyl having from five to six ring-carbon atoms, phenyl, lower alkylphenyl, halophenyl and lower alkyl-halophenyl, $R_7$ for a member selected from the group consisting of lower alkyl and nitro, each of $R_8$ and $R_9$ for a member selected from the group consisting of hydrogen, lower alkyl and chloro, and $n$ for the integer from 0 to 1, and a therapeutically acceptable acid addition salt thereof.

2. A compound as claimed in claim 1 and having the formula

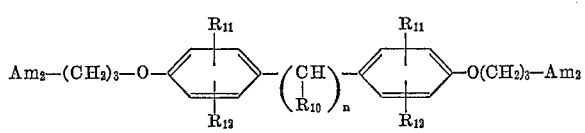

in which $Am_2$ stands for a member selected from the group consisting of dimethylamino and diethylamino, $R_{10}$ for a member selected from the group consisting of hydrogen, lower alkyl, cycloalkyl and cycloalkenyl having from five to six ring-carbon atoms, phenyl, lower alkyl-phenyl and halophenyl, $R_{11}$ for lower alkyl, $R_{12}$ for tertiary lower alkyl, and $n$ for the integer from 0 to 1, and a therapeutically acceptable acid addition salt thereof.

3. A compound as claimed in claim 1 and being a member selected from the group consisting of 1,1-di-[4-(3-dimethylaminopropoxy) - 2 - methyl - 5 - tert. butylphenyl]-n-butane and a therapeutically acceptable acid addition salt thereof.

4. A compound as claimed in claim 1 and being a member selected from the group consisting of 4,4'-(3-dimethylaminopropoxy) - 3,3' - dimethyl - 5,5' - di-tert. butyl-[1,1'-biphenyl] and a therapeutically acceptable acid addition salt thereof.

5. A compound as claimed in claim 1 and being a member selected from the group consisting of 4,4'-(3-dimethylaminopropoxy) - 3,3',5,5' - tetra-tert. butyl-[1,1'-biphenyl] and a therapeutically acceptable acid addition salt thereof.

6. A compound as claimed in claim 1 and being a member selected from the group consisting of di[4-(3-dimethylaminopropoxy) - 3 - methyl-5-tert. butyl-phenyl]-methane and a therapeutically acceptable acid addition salt thereof.

7. A compound as claimed in claim 1 and being a member selected from the group consisting of di-[4-(3-dimethylaminopropoxy) - 3,5 - di-tert. butyl-phenyl]-methane and a therapeutically acceptable acid addition salt thereof.

8. A compound as claimed in claim 1 and being a member selected from the group consisting of di-[4-(3-dimethylaminopropoxy) - 2 - methyl-5-tert. butyl-phenyl]-(3-cyclohexenyl)-methane and a therapeutically acceptable acid addition salt thereof.

9. A compound as claimed in claim 1 and being a member selected from the group consisting of di-[4-(3-dimethylaminopropoxy) - 2 - methyl-5-tert. butyl-phenyl]-phenyl-methane and a therapeutically acceptable acid addition salt thereof.

10. A compound as claimed in claim 1 and being a member selected from the group consisting of 4,4'-(2-dimethylamino-n-propoxy) - 3,3' - dimethyl-5,5'-di-tert. butyl-[1,1'-biphenyl] and a therapeutically acceptable acid addition salt thereof.

11. A compound as claimed in claim 1 and being a member selected from the group consisting of 4,4'-(3-dimethylaminopropoxy) - 3,3',5,5' - tetramethyl - [1,1'-biphenyl] and a therapeutically acceptable acid addition salt thereof.

12. A compound as claimed in claim 1 and being a member selected from the group consisting of γ-di-[4-(3- dimethylamniopropoxy) - 3 - nitro-phenyl]-valeric acid N,N-dimethylamide and a therapeutically acceptable acid addition salt thereof.

13. A compound as claimed in claim 1 and being a member selected from the group consisting of γ-di-[4-(3-dimethylaminopropoxy) - 3,5 - dichloro-phenyl]-valeric acid N,N-dimethylamide and a therapeutically acceptable acid addition salt thereof.

14. A member selected from the group consisting of di-[2-(3-dimethylamino - propoxy) - 3,5,6 - trichloro-phenyl]-methane and a therapeutically acceptable acid addition salt thereof.

References Cited

UNITED STATES PATENTS

| | | | |
|---|---|---|---|
| 3,247,199 | 4/1966 | Marxer et al. | 260—570.7 |
| 3,150,144 | 9/1964 | Palopoli et al. | 260—570.7 |

FOREIGN PATENTS 223,608  10/1962  Austria.

HENRY R. JILES, *Primary Examiner.*

H. I. MOATZ, *Assistant Examiner.*

U.S. Cl. X.R.

260—239, 243, 247.7, 268, 294, 294.7, 326.3, 519, 570.7, 999; 424—244, 246, 248, 250, 267, 274, 317, 330

PO-1050
(5/69)

UNITED STATES PATENT OFFICE
CERTIFICATE OF CORRECTION

Patent No. 3,449,418                         Dated  June 10, 1969

Inventor(s)   LINCOLN HARVEY WERNER

It is certified that error appears in the above-identified patent and that said Letters Patent are hereby corrected as shown below:

Column 11, line 68, that portion of the formula reading $O-alk_1$  A        should read        $O-alk_1-Am_1$ Column 12, line 17, that portion of the formula reading $O(CH_2)_3-Am_2$        should read        $O-(CH_2)_3-Am_2$

SIGNED AND
SEALED
JAN 19 1971

(SEAL)
Attest:

Edward M. Fletcher, Jr.
Attesting Officer

WILLIAM E. SCHUYLER, JR.
Commissioner of Patents